(12) United States Patent
Goto et al.

(10) Patent No.: US 10,833,338 B2
(45) Date of Patent: Nov. 10, 2020

(54) SEAL STRUCTURE (71) Applicant: HONDA MOTOR CO., LTD., Minato-ku, Tokyo (JP)

(72) Inventors: Shuhei Goto, Wako (JP); Ken Takahashi, Wako (JP); Kazuo Nunokawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 91 days.

(21) Appl. No.: 16/175,263

(22) Filed: Oct. 30, 2018

(65) Prior Publication Data

US 2019/0131637 A1    May 2, 2019

(30) Foreign Application Priority Data

Nov. 1, 2017   (JP) ................. 2017-211603

(51) Int. Cl.
*H01M 8/0276*       (2016.01)
*H01M 8/0273*       (2016.01)

(52) U.S. Cl.
CPC ....... *H01M 8/0276* (2013.01); *H01M 8/0273* (2013.01)

(58) Field of Classification Search
None
See application file for complete search history.

(56) References Cited

U.S. PATENT DOCUMENTS

2017/0151599 A1   6/2017  Miyagi et al.

FOREIGN PATENT DOCUMENTS

| JP | 11-244952 A | 9/1999 |
|---|---|---|
| JP | 2006-159232 A | 6/2006 |
| JP | 5239091 B2 | 7/2013 |
| WO | 2009/043600 A1 | 4/2009 |
| WO | 2015-199231 A1 | 12/2015 |

OTHER PUBLICATIONS

Office Action dated Jun. 25, 2019 issued over the correponding Japanese Patent Application No. 2017-211603 with the English translation thereof.

*Primary Examiner* — Jonathan Crepeau
(74) *Attorney, Agent, or Firm* — Carrier Blackman & Associates, P.C.; William D. Blackman; Joseph P. Carrier (57) ABSTRACT

Bead seal structure includes an outer bead (bead seal) for preventing leakage of fluid, and a first bypass stop protrusion (intersecting element) which intersects with the outer bead. The first bypass stop protrusion includes a root as a rising start point from a base plate and side walls which rise from the base plate. The radius of curvature of connection parts of the roots connected to the outer bead is larger than the radius of curvature of connection parts of the side walls connected to the outer bead.

9 Claims, 10 Drawing Sheets

SEAL STRUCTURE

CROSS-REFERENCE TO RELATED APPLICATION

This application is based upon and claims the benefit of priority from Japanese Patent Application No. 2017-211603 filed on Nov. 1, 2017, the contents of which are incorporated herein by reference.

BACKGROUND OF THE INVENTION

Field of the Invention

The present invention relates to bead structure provided for a fuel cell metal separator.

Description of the Related Art

In general, a solid polymer electrolyte fuel cell adopts a solid polymer electrolyte membrane. The solid polymer electrolyte membrane is a polymer ion exchange membrane. The fuel cell includes a membrane electrode assembly (MEA) formed by providing an anode on one surface of the solid polymer electrolyte membrane, and a cathode on the other surface of the solid polymer electrolyte membrane. The MEA is sandwiched between separators (bipolar plates) to form a power generation cell (unit cell). In use, a predetermined number of power generation cells are stacked together to form, e.g. an in-vehicle fuel cell stack mounted in a vehicle.

In the power generation cell, as the separators, metal separators may be used. An anode side metal separator is provided on one surface of the MEA, and a cathode side metal separator is provided on the other surface of the MEA. A fuel gas flow field is formed in the anode side metal separator, for allowing a fuel gas as one of reactant gases to flow along the anode. An oxygen-containing gas flow field is formed in the cathode side metal separator, for allowing an oxygen-containing gas as the other of the reactant gases to flow along the cathode.

In this regard, according to the disclosure of Japanese Patent No. 5239091, in order to reduce the production cost, a ridge shaped bead seal (border wall 7) is formed by press forming as a seal in a metal separator. Further, in the technique of Japanese Patent No. 5239091, in order to prevent bypassing of the reactant gas at the end of the reactant gas flow field of the metal separator in the flow field width direction, a bypass stop ridge (restricting member 10) which intersects with the bead seal is provided.

SUMMARY OF THE INVENTION

The present invention has been made in relation to the above conventional technique, and in bead seal structure where an intersecting element (bypass stop protrusion, etc.) which intersects with a bead seal is provided, an object of the present is to achieve uniform surface pressure distribution at the top of the bead structure.

In order to achieve the above object, bead seal structure includes: a bead seal formed in a fuel cell metal separator to protrude in a separator thickness direction, the bead seal being configured to prevent leakage of fluid; and an intersecting element intersecting with the bead seal, wherein the intersecting element includes a root as a rising start point from a base plate of the fuel cell metal separator, and a side wall rising from the base plate; and a radius of curvature of a connection part of the root connected to the bead seal is larger than a radius of curvature of a connection part of the side wall connected to the bead seal.

Preferably, the intersecting element may be a bypass stop protrusion configured to prevent bypassing of the fluid, or a tunnel including an internal space connected to the bead seal.

Preferably, the intersecting element may be configured to intersect with the bead seal at an angle of 90° in a plan view as viewed in the separator thickness direction.

Preferably, a top height of the intersecting element may be lower than a top height of the bead seal.

Preferably, the bead seal may have a trapezoidal shape in cross section.

Preferably, the intersecting element may have a trapezoidal shape in cross section.

In the bead seal structure of the present invention, the radius of curvature of the connection part of the root of the intersecting element connected to the bead seal is larger than the radius of curvature of the connection part of the side wall of the intersecting element connected to the bead seal. In the structure, it is possible to reduce the sensitivity of the surface pressure (seal surface pressure) of the top of the bead seal to the dimensional variation such as tolerance. Accordingly, it is possible to achieve uniform surface pressure distribution (suppression of surface pressure variation) at the top of the bead seal.

The above and other objects, features, and advantages of the present invention will become more apparent from the following description when taken in conjunction with the accompanying drawings in which preferred embodiments of the present invention is shown by way of illustrative example.

DESCRIPTION OF THE PREFERRED EMBODIMENTS

Hereinafter, a preferred embodiment of bead seal structure according to the present invention will be described with reference to the accompanying drawings.

Figure 1:
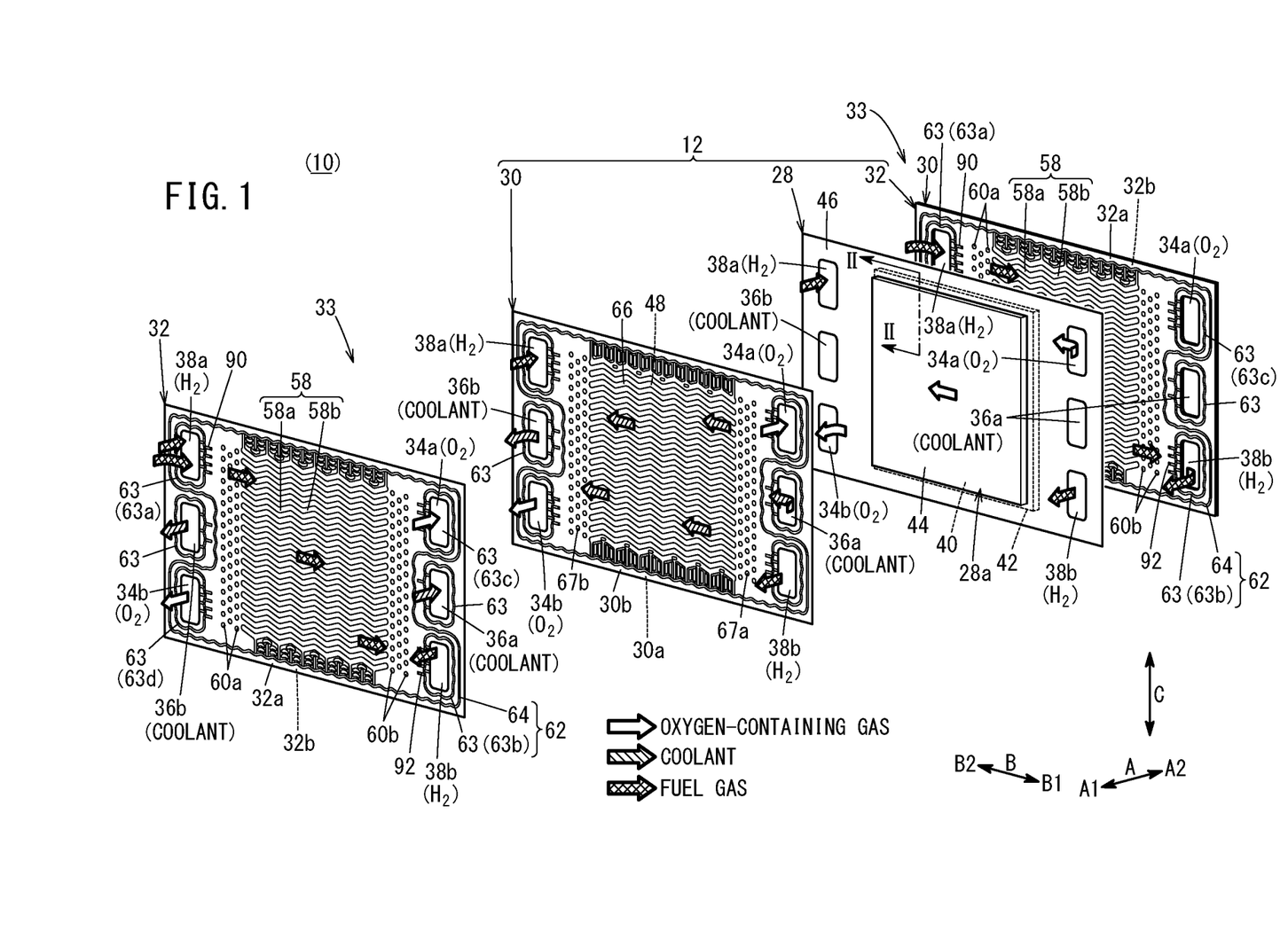
FIG. 1 is an exploded perspective view showing a power generation cell having bead seal structure according to an embodiment of the present invention.

A power generation cell 12 as a part of a unit of a fuel cell (unit cell) shown in FIG. 1 includes a resin film equipped MEA 28, a first metal separator 30 provided on one surface of the resin film equipped MEA 28 (in a direction indicated by an arrow A1), and a second metal separator 32 provided on the other surface of the resin film equipped MEA 28 (in a direction indicated by an arrow A2). A plurality of power generation cells 12 are stacked together in a direction indicated by the arrow A (horizontal direction) or in a direction indicated by an arrow C (gravity direction), and a tightening load (compression load) is applied to the power generation cells 12 to form the fuel cell stack 10. For example, the fuel cell stack 10 is mounted as an in-vehicle fuel cell stack, in a fuel cell electric automobile (not shown).

Each of the first metal separator 30 and the second metal separator 32 is formed by press forming of a metal thin plate to have a corrugated shape in cross section. For example, the metal plate is a steel plate, a stainless steel plate, an aluminum plate, a plated steel plate, or a metal plate having an anti-corrosive surface by surface treatment. The first metal separator 30 of one of the adjacent power generation cells 12 and the second metal separator 32 of the other of the adjacent power generation cells 12 are joined together by welding, brazing, crimping, etc. the outer peripheral portions thereof, to form a joint separator 33.

At one end of the power generation cell 12 in a longitudinal direction indicated by an arrow B1 (horizontal direction), an oxygen-containing gas supply passage 34a, a coolant supply passage 36a, and a fuel gas discharge passage 38b are provided. The oxygen-containing gas supply passage 34a, the coolant supply passage 36a, and the fuel gas discharge passage 38b extend through the power generation cell 12 in the stacking direction indicated by the arrow A. The oxygen-containing gas supply passage 34a, the coolant supply passage 36a, and the fuel gas discharge passage 38b are arranged in the vertical direction indicated by the arrow C. An oxygen-containing gas is supplied through the oxygen-containing gas supply passage 34a. A coolant such as water is supplied through the coolant supply passage 36a. A fuel gas such as a hydrogen-containing gas is discharged through the fuel gas discharge passage 38b.

At the other end of the power generation cell 12 in the longitudinal direction indicated by an arrow B2, a fuel gas supply passage 38a, a coolant discharge passage 36b, and an oxygen-containing gas discharge passage 34b are provided. The fuel gas supply passage 38a, the coolant discharge passage 36b, and the oxygen-containing gas discharge passage 34b extend through the power generation cell 12 in the stacking direction. The fuel gas supply passage 38a, the coolant discharge passage 36b, and the oxygen-containing gas discharge passage 34b are arranged in the vertical direction. The fuel gas is supplied through the fuel gas supply passage 38a. The coolant is discharged through the coolant discharge passage 36b. The oxygen-containing gas is discharged through the oxygen-containing gas discharge passage 34b. The layout of the oxygen-containing gas supply passage 34a, the oxygen-containing gas discharge passages 34b, the fuel gas supply passage 38a, and the fuel gas discharge passage 38b is not limited to the above embodiment, and may be changed depending on the required specification.

Figure 2:
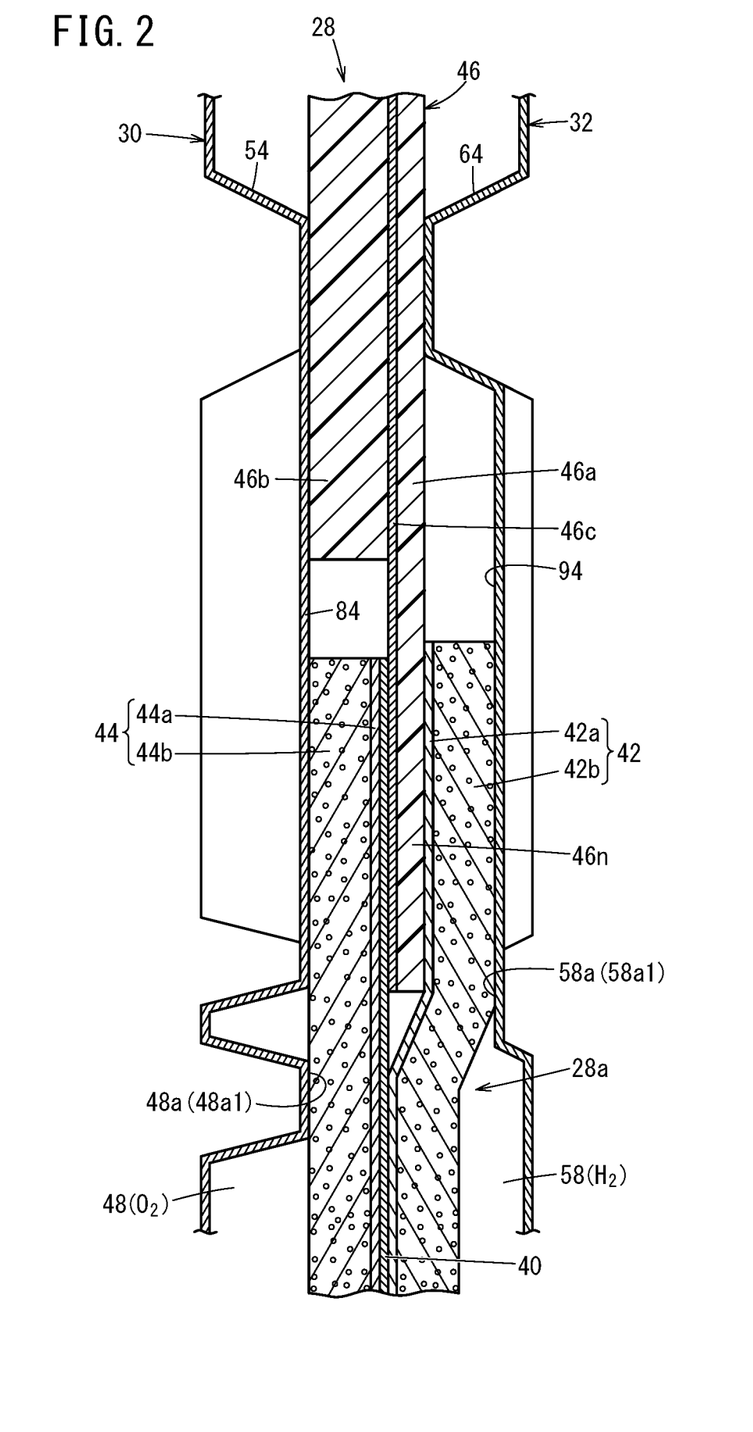
FIG. 2 is a cross sectional view showing a power generation cell taken along a line II-II in FIGS. 1 and 4.

As shown in FIG. 2, the resin film equipped MEA 28 includes a membrane electrode assembly 28a (hereinafter referred to as the "MEA 28a"), and a frame shaped resin film 46 provided in the outer portion of the MEA 28a.

The MEA 28a includes an electrolyte membrane 40, and an anode 42 and a cathode 44 sandwiching the electrolyte membrane 40. For example, the electrolyte membrane 40 includes a solid polymer electrolyte membrane (cation ion exchange membrane). For example, the solid polymer electrolyte membrane is a thin membrane of perfluorosulfonic acid containing water. The electrolyte membrane 40 is sandwiched between the anode 42 and the cathode 44. A fluorine based electrolyte may be used as the electrolyte membrane 40. Alternatively, an HC (hydrocarbon) based electrolyte may be used as the electrolyte membrane 40.

The cathode 44 includes a first electrode catalyst layer 44a joined to one surface of the electrolyte membrane 40, and a first gas diffusion layer 44b stacked on the first electrode catalyst layer 44a. The anode 42 includes a second electrode catalyst layer 42a stacked on the other surface of the electrolyte membrane 40, and a second gas diffusion layer 42b stacked on the second electrode catalyst layer 42a.

The first electrode catalyst layer 44a and the second electrode catalyst layer 42a are formed on both surfaces of the electrolyte membrane 40. For example, the first electrode catalyst layer 44a is formed by porous carbon particles deposited uniformly on the surface of the first gas diffusion layer 44b together with an ion conductive polymer binder and platinum alloy supported on the porous carbon particles. For example, the second electrode catalyst layer 42a is formed by porous carbon particles deposited uniformly on the surface of the second gas diffusion layer 42b together with an ion conductive polymer binder and platinum alloy supported on the porous carbon particles. Each of the first gas diffusion layer 44b and the second gas diffusion layer 42b comprises a carbon paper or a carbon cloth, etc.

As shown in FIG. 1, at one end of the resin film 46 in the direction indicated by the arrow B1, the oxygen-containing gas supply passage 34a, the coolant supply passage 36a, and the fuel gas discharge passage 38b are provided. At the other end of the resin film 46 in the direction indicated by the arrow B2, the fuel gas supply passage 38a, the coolant discharge passage 36b, and the oxygen-containing gas discharge passage 34b are provided.

As shown in FIG. 2, the resin film 46 includes two frame shaped sheets 46a, 46b having different thicknesses. Specifically, the resin film 46 includes a first frame shaped sheet 46a and a second frame shaped sheet 46b. The inner portion of the first frame shaped sheet 46a is joined to the outer portion of the MEA 28a. The second frame shaped sheet 46b is joined to the first frame shaped sheet 46a. The first frame shaped sheet 46a and the second frame shaped sheet 46b are joined together in the thickness direction by an adhesive layer 46c made of adhesive. The second frame shaped sheet 46b is joined to the outer portion of the first frame shaped sheet 46a.

The first frame shaped sheet 46a and the second frame shaped sheet 46b are made of resin material. Examples of materials of the first frame shaped sheet 46a and the second frame shaped sheet 46b include PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin.

An inner peripheral portion 46n of the resin film 46 (inner peripheral portion of the first frame shaped sheet 46a) is provided between the outer peripheral portion of the anode 42 and the outer peripheral portion of the cathode 44. Specifically, the inner peripheral portion 46n of the resin film 46 is interposed between the outer peripheral portion of the electrolyte membrane 40 and the outer peripheral portion of the anode 42. The inner peripheral portion 46n of the resin film 46 and the outer peripheral portion of the electrolyte membrane 40 are joined together through the adhesive layer 46c. The inner peripheral portion 46n of the resin film 46 may be interposed between the electrolyte membrane 40 and the cathode 44.

It should be noted that the electrolyte membrane 40 may be configured to protrude outward without using the resin film 46. Alternatively, a frame shaped film may be provided on both sides of the electrolyte membrane 40 which protrudes outward.

Figure 3:
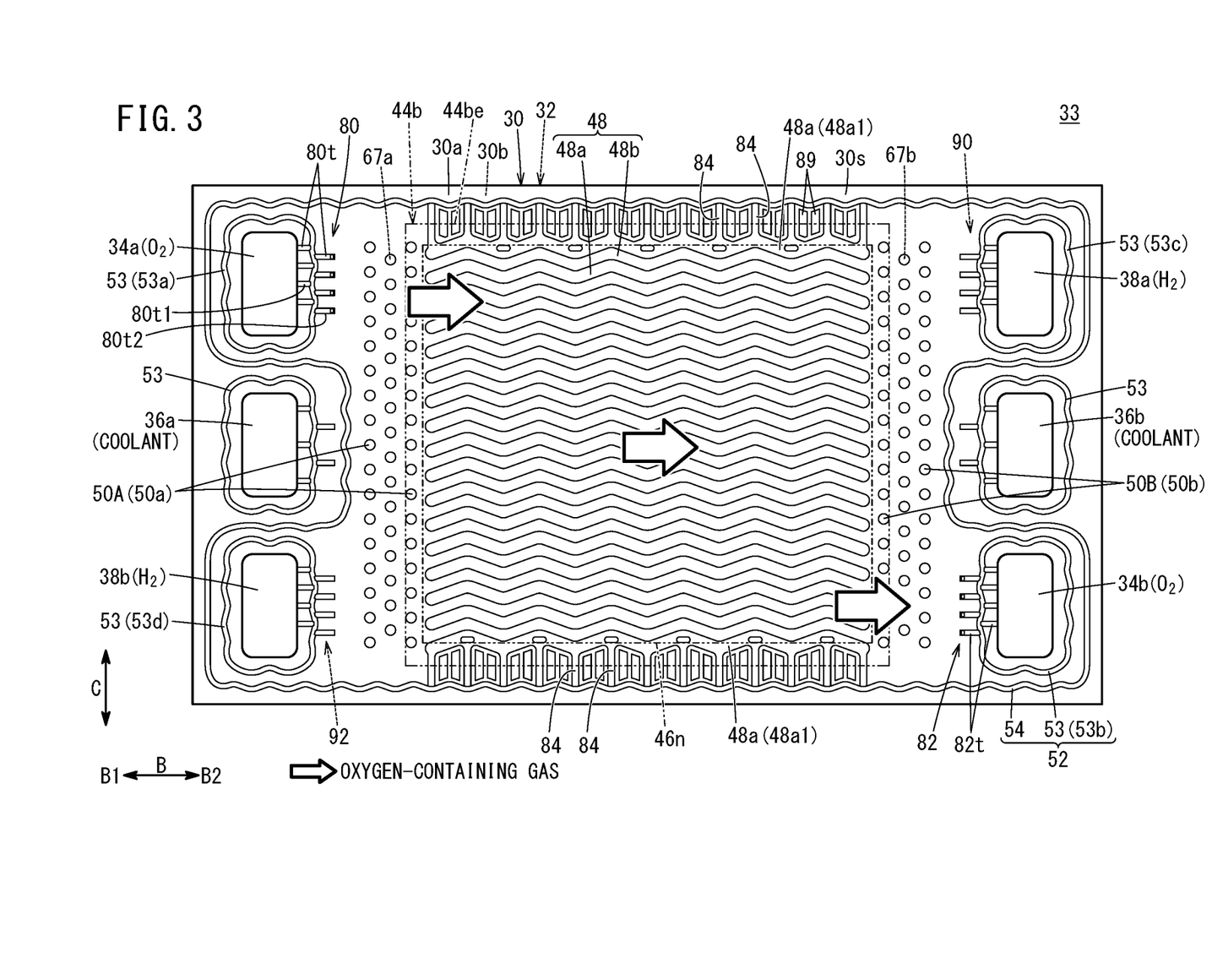
FIG. 3 is a plan view showing a power generation cell as viewed from the first metal separator.

As shown in FIG. 3, an oxygen-containing gas flow field 48 is provided on a surface 30a of the first metal separator 30 facing the resin film equipped MEA 28 (hereinafter referred to as the "surface 30a"). For example, the oxygen-containing gas flow field 48 extends in the direction indicated by the arrow B. The oxygen-containing gas flow field 48 is connected to (in fluid communication with) the oxygen-containing gas supply passage 34a and the oxygen-containing gas discharge passage 34b. The oxygen-containing gas flow field 48 includes a plurality of flow grooves 48b formed between a plurality of flow field forming ridges 48a extending in the direction indicated by the arrow B. Therefore, in the oxygen-containing gas flow field 48, the plurality of flow field forming ridges 48a and the plurality of flow grooves 48b are provided alternately in the flow field width direction (indicated by the arrow C). In the embodiment of the present invention, the flow field forming ridges 48a and the flow grooves 48b have a wavy shape in a plan view. However, the resent invention is not limited in this respect. The flow field forming ridges 48a and the flow grooves 48b may have a straight shape in a plan view.

Side walls on both sides of the flow field forming ridges 48a in the width direction (indicated by the arrow C) are inclined from the separator thickness direction. The flow field forming ridges 48a have a trapezoidal shape in lateral cross section. It should be noted the side walls of the flow field forming ridges 48a may be in parallel to the separator thickness direction. The flow field forming ridges 48a may have a rectangular shape in lateral cross section. Hereinafter, among the plurality of flow field forming ridges 48a, flow field forming ridges at both ends in the flow field width direction will be referred to as the "end flow field forming ridges 48a1". The end flow field forming ridges 48a1 are provided inside outer ends 44be of the first gas diffusion layer 44b.

An inlet buffer 50A is provided on the surface 30a of the first metal separator 30, between the oxygen-containing gas supply passage 34a and the oxygen-containing gas flow field 48. The inlet buffer 50A includes a plurality of boss arrays each including a plurality of bosses 50a arranged in a direction indicated by an arrow C. Further, an outlet buffer 50B is provided on the surface 30a of the first metal separator 30, between the oxygen-containing gas discharge passage 34b and the oxygen-containing gas flow field 48. The outlet buffer 50B includes a plurality of boss arrays each including a plurality of bosses 50b.

On a surface 30b of the first metal separator 30 opposite to the oxygen-containing gas flow field 48, boss arrays each including a plurality of bosses 67a arranged in the direction indicated by the arrow C are provided between the boss arrays of the inlet buffer 50A, and boss arrays each including a plurality of bosses 67b arranged in the direction indicated by the arrow C are provided between the boss arrays of the outlet buffer 50B (see FIG. 1). The bosses 67a and the bosses 67b protrude toward the surface 30b. The bosses 67a, 67b form a buffer on the coolant surface.

A first seal line 52 is formed on the surface 30a of the first metal separator 30 by press forming. The first seal line 52 is expanded toward the resin film equipped MEA 28 (FIG. 1). Though not shown in detail, resin material may be fixed to protruding front surfaces of the first seal line 52 by printing, coating, etc. The resin material is not essential. The resin material may be dispensed with.

The first seal line 52 includes a plurality of bead seals 53 (hereinafter referred to as the "passage beads 53") provided around a plurality of fluid passages (oxygen-containing gas supply passage 34a, etc.), and a bead seal 54 (hereinafter referred to as the "outer bead 54") provided around the oxygen-containing gas flow field 48, the inlet buffer 50A, and the outlet buffer 50B. The passage bead 53 and the outer bead 54 have a wavy shape in a plan view as viewed in the thickness direction of the first metal separator 30. The passage bead 53 and the outer bead 54 may have a straight shape in a plan view.

The plurality of passage beads 53 protrude from the surface 30a of the first metal separator 30 toward the resin film equipped MEA 28. The passage beads 53 are provided around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b, respectively. Hereinafter, among the plurality of passage beads 53, the passage bead formed around the oxygen-containing gas supply passage 34a will be referred to as the "passage bead 53a", and the passage bead formed around the oxygen-containing gas discharge passage 34b will be referred to as the "passage bead 53b".

The first metal separator 30 has bridge sections 80, 82 connecting the inside of the passage beads 53a, 53b (fluid passages 34a, 34b) and the outside (oxygen-containing gas flow field 48) of the passage beads 53a, 53b. The bridge section 80 is provided on a side part of the passage bead 53a formed around the oxygen-containing gas supply passage 34a, adjacent to the oxygen-containing gas flow field 48. The bridge section 82 is provided on a side part of the passage bead 53b formed around the oxygen-containing gas discharge passage 34b, adjacent to the oxygen-containing gas flow field 48.

The bridge sections 80, 82 include a plurality of tunnels 80t, 82t (intersecting elements which intersect with bead seals) inside and outside the passage beads 53a, 53b, respectively. The tunnels 80t, 82t are formed by press forming to protrude from the surface 30a of the first metal separator 30 toward the resin film equipped MEA 28 (see FIG. 2).

Figure 4:
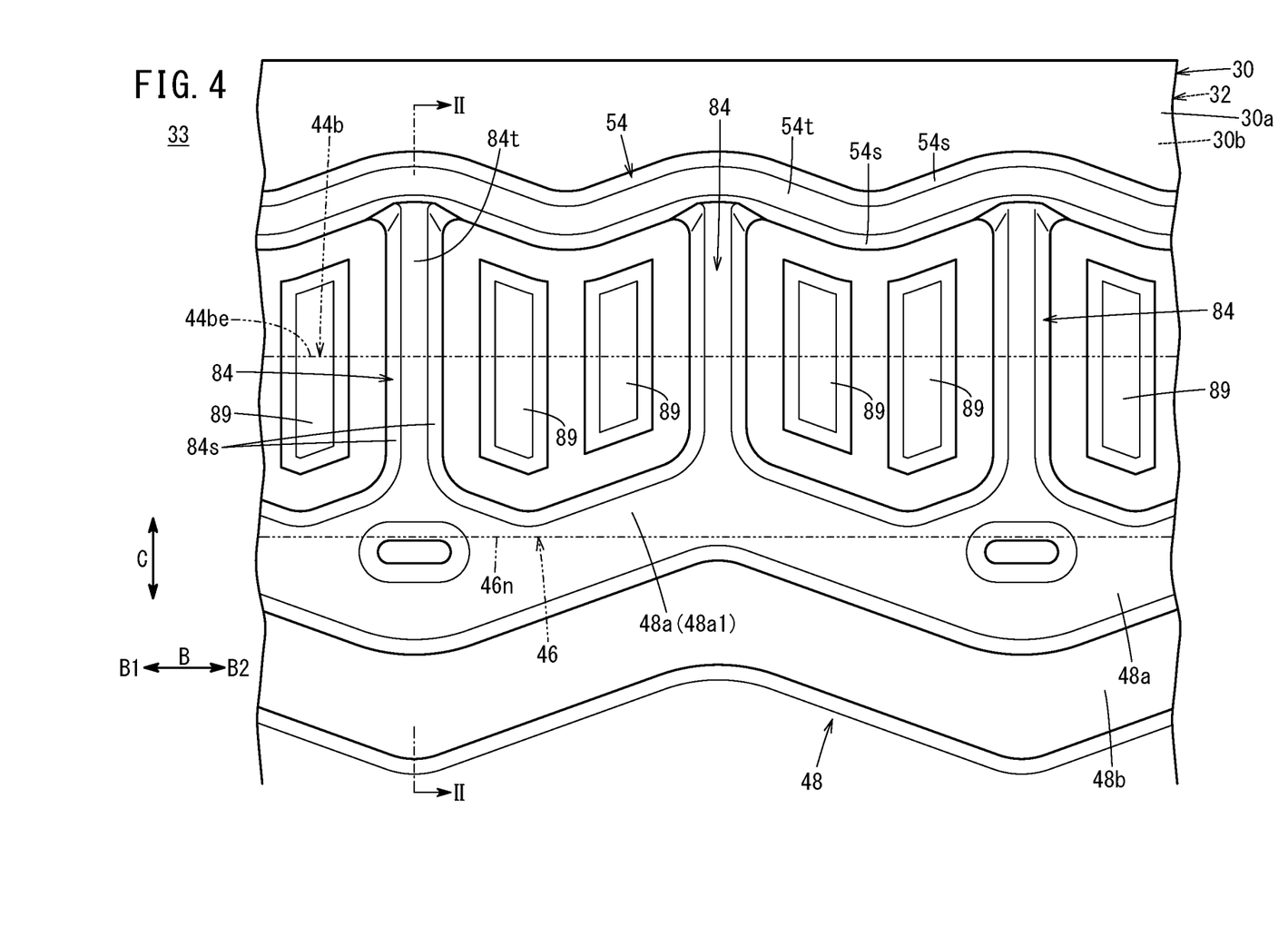
FIG. 4 is an enlarged plan view showing main components of the first metal separator.

As shown in FIG. 4, first bypass stop protrusions 84 (intersecting elements which intersect with bead seals) for preventing bypassing of the oxygen-containing gas are provided between both ends of the oxygen-containing gas flow field 48 in the flow filed width direction (end flow field forming ridges 48a1) and the outer bead 54. In the embodiment of the present invention, the flow field width direction of the oxygen-containing gas flow field 48 is the direction (indicated by the arrow C) along the short sides of the rectangular first metal separator 30. The first bypass stop protrusions 84 are formed to protrude toward the resin film equipped MEA 28 (see FIG. 2). Each of the first bypass stop protrusions 84 has one end connected to the outer bead 54, and the other end connected to the end flow field forming ridge 48a1. The first bypass stop protrusions 84 intersect with the outer bead 54. In the embodiment of the present invention, the first bypass stop protrusions 84 intersect with the outer bead 54 at an angle of substantially 90° in a plan view as viewed in the separator thickness direction. The outer bead 54 includes a wavy portion in a plan view as viewed in the separator thickness direction. The first bypass stop protrusions 84 as the intersecting elements are connected to the curves of the wavy portion of the outer bead 54. Specifically, the first bypass stop protrusions 84 are connected to curves of the wavy portion of the outer bead 54 protruding toward the outer marginal portion of the first metal separator 30.

A plurality of the first bypass stop protrusions 84 are arranged at intervals in the direction in which the end flow field forming ridge 48a1 extend (indicated by the arrow B). Intermediate protrusions 89 supporting the outer end of the MEA 28a are provided between the first bypass stop protrusions 84 that are adjacent to each other. The intermediate protrusions 89 protrude toward the resin film equipped MEA 28. A plurality of the intermediate protrusions 89 are provided in each position between the first bypass stop protrusions 84 that are adjacent to each other.

Figure 5:
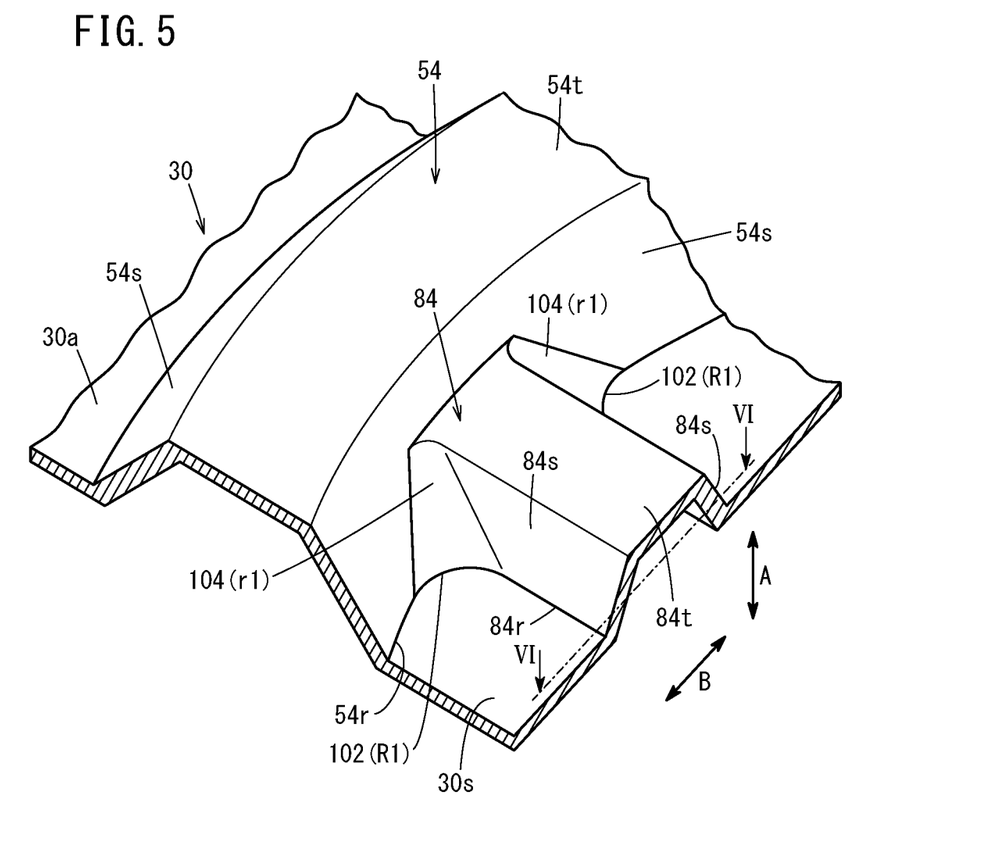
FIG. 5 is a perspective cross sectional view showing bead seal structure according to the embodiment of the present invention.

As shown in FIG. 5, the outer bead 54 has a substantially trapezoidal shape in cross section which is tapered toward its protruding front end. Specifically, both side walls 54s of the outer bead 54 are inclined from the separator thickness direction (indicated by the arrow A). In the state where no tightening load is applied (before assembling), the shape at a top 54t which is the protruding end of the outer bead 54 has a curved shape expanded in the protruding direction of the outer bead 54. In the state where the tightening load is applied after assembling the fuel cell stack 10, the shape at the top 54t of the outer bead 54 has a flat shape. It should be noted that the side walls 54s on both sides of the outer bead 54 in the width direction may be in parallel to the separator thickness direction, and the outer bead 54 may have a rectangular shape in lateral cross section.

The first bypass stop protrusion 84 includes a root 84r as a rising start point from a base plate 30s. Each of side walls 84s rises from the base plate 30s, and form a portion extending from the root 84r to a top 84t. The side walls 84s on both sides of the first bypass stop protrusion 84 (indicated by the arrow B) are inclined from the separator thickness direction, and the first bypass stop protrusion 84 has a substantially trapezoidal shape in lateral cross section. It should be noted that the side walls 84s on both sides of the first bypass stop protrusion 84 in the width direction may be in parallel to the separator thickness direction, and the first bypass stop protrusion 84 may have a substantially rectangular shape in lateral cross section. The protruding height of the first bypass stop protrusion 84 from the base plate 30s of the first metal separator 30 (height of the top 84t) is lower than the protruding height of the outer bead 54 from the base plate 30s (height of the top 54t).

A connection part 102 of the root 84r of the first bypass stop protrusion 84 connected to the outer bead 54 (connection part connected to a root 54r of the outer bead 54) is curved in a circular arc shape. At the connection part 102, the root 84r of the first bypass stop protrusion 84 and the root 54r of the outer bead 54 are connected together. A connection part 104 of the side wall 84s of the first bypass stop protrusion 84 connected to the outer bead 54 (side wall 54s of the outer bead 54) is curved in a circular arc shape. At the connection part 104, the side wall 84s of the first bypass stop protrusion 84 and the side wall 54s of the outer bead 54 are connected together, between the root 84r and the top 84t.

Figure 6:
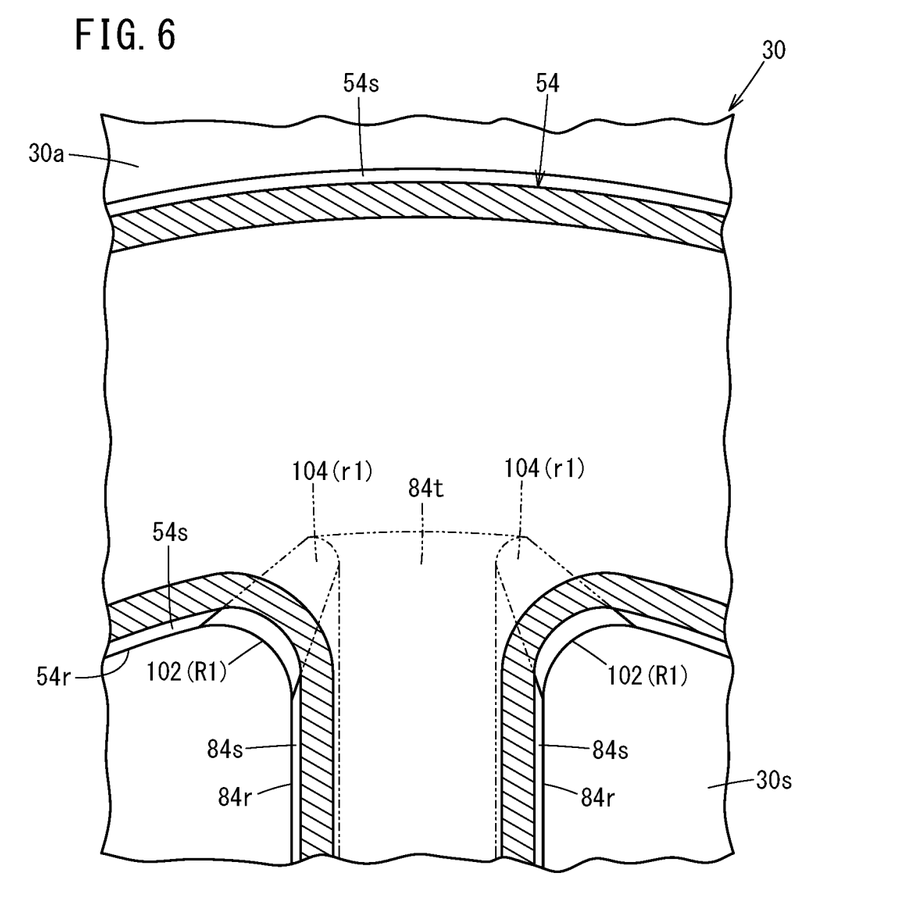
FIG. 6 is a cross sectional view taken along a line VI-VI in FIG. 5.

As shown in FIG. 6, the radius of curvature R1 of the connection part 102 between the roots 54r, 84r is larger than the radius of curvature r1 of the connection part 104 between the side walls 54s, 84s (R1>r1). The radius of curvature r1 of the connection part 104 between the side walls 54s, 84s gets larger toward the connection part 102 between the roots 54r, 84r. The connection part 102 between the roots 54r, 84r may not be a curve (circular arc) including a single radius of curvature. The connection part 102 may be a curve having different radii of curvature. The connection part 104 may include a portion where the radius of curvature r1 is substantially zero.

Figure 7:
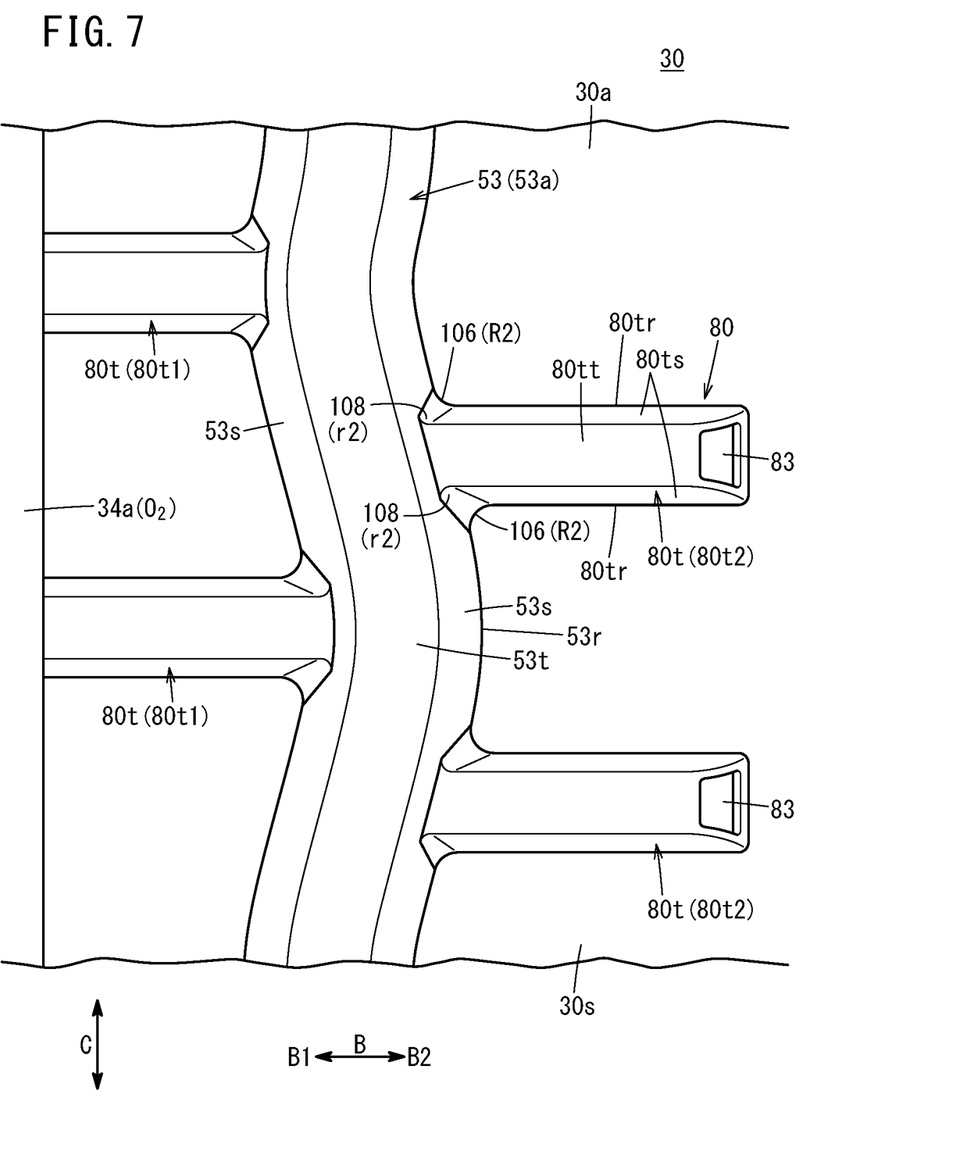
FIG. 7 is an enlarged plan view of a passage bead provided in the first metal separator.

As shown in FIG. 7, the tunnels 80t of the bridge section 80 include a plurality of inner tunnels 80t1 protruding from an inner side wall 53s of the passage bead 53a toward the oxygen-containing gas supply passage 34a, and a plurality of outer tunnels 80t2 protruding from an outer side wall 53s of the passage bead 53a toward the oxygen-containing gas flow field 48 (FIG. 3). The inner space as a recess formed on the back side of each tunnel 80t is connected to the inner space formed on the back of the passage bead 53a. Each of the tunnels 80t intersects with the passage bead 53a. In the embodiment of the present invention, each of the tunnels 80t intersects with the passage bead 53a at an angle of substantially 90°.

The inner tunnels 80t1 are provided at intervals in the direction in which the passage bead 53a extends. An end of each of the inner tunnels 80t1 opposite to the side connected to the passage bead 53a is opened to the oxygen-containing gas supply passage 34a.

The outer tunnels 80t2 are provided at intervals in the direction in which the passage bead 53a extends. An opening 83 is provided at an end of the outer tunnel 80t2 opposite to a portion connected to the passage bead 53a. The opening 83 extends through the outer tunnel 80t2, from the inside to the outside of the outer tunnel 80t2.

The plurality of inner tunnels 80t1 and the plurality of outer tunnels 80t2 are provided alternately (in a zigzag pattern) along the passage bead 53a. The plurality of inner tunnels 80t1 and the plurality of outer tunnels 80t2 may be provided oppositely through the passage bead 53a.

The passage bead 53a has a substantially trapezoidal shape in cross section which is tapered toward its protruding front end. Specifically, the side walls 53s on both sides of the passage bead 53a are inclined from the separator thickness direction. In the state where no tightening load is applied (before assembling), the shape at a top 53t which is the protruding end of the passage bead 53a has a curved shape expanded in the protruding direction of the passage bead 53a. In the state where the tightening load is applied after assembling the fuel cell stack 10, the shape at the top 54t of the passage bead 53a has a flat shape. It should be noted that the side walls 53s on both sides of the passage bead 53a may be in parallel to the separator thickness direction, and the passage bead 53a may have a rectangular shape in lateral cross section.

The tunnel 80t includes roots 80tr as rising start points from the base plate 30s. Each of side walls 80ts of the tunnel 80t rises from the base plate 30s, and forms a portion extending from the root 80tr to a top 80tt. Each of the tunnels 80t has a substantially trapezoidal shape in cross section which is tapered toward the protruding front end. Specifically, the side walls 80ts on both sides of the tunnel 80t are inclined from the separator thickness direction. It should be noted that the side walls 80ts of the tunnel 80t may be in parallel to the separator thickness direction, and the tunnel 80t may have a rectangular shape in lateral cross section. The protruding height of the tunnel 80t from the base plate 30s of the first metal separator 30 (height of the top 80tt) is lower than the protruding height of the passage bead 53a from the base plate 30s (height of the top 53t).

A connection part 106 of the root 80tr of the tunnel 80t connected to the passage bead 53a (connection part connected to a root 53r of the passage bead 53a) is curved in a circular arc shape. A connection part 108 of the side wall 80ts of the tunnel 80t connected to the passage bead 53a (side wall 53s of the passage bead 53a) is curved in a circular arc shape.

The radius of curvature R2 of the connection part 106 between the root 53r of the passage bead 53a and the root 80tr of the tunnel 80t is larger than the radius of curvature r2 of the connection part 108 between the side walls 53s, 80ts (R2>r2). The radius of curvature r2 of the connection part 108 between the side walls 53s, 80ts gets larger toward the connection part 106 between the roots 53r, 80tr. The connection part 106 between the root 53r of the passage bead 53a and the root 80tr of the tunnel 80t may not be a curve (circular arc) including a single radius of curvature. The connection part 108 may be a curve having different radii of curvature. The connection part 108 may include a portion where the radius of curvature r2 is substantially zero. The connection part between the inner tunnel 80t1 and the passage bead 53a has the same structure as the connection part between the outer tunnel 80t2 and the passage bead 53a.

It should be noted that the plurality of tunnels 82t of the bridge section 82 (the other of the bridge sections) of the first metal separator 30 have the same structure as the plurality of tunnels 80t of the bridge section 80 (one of the bridge sections).

Figure 8:
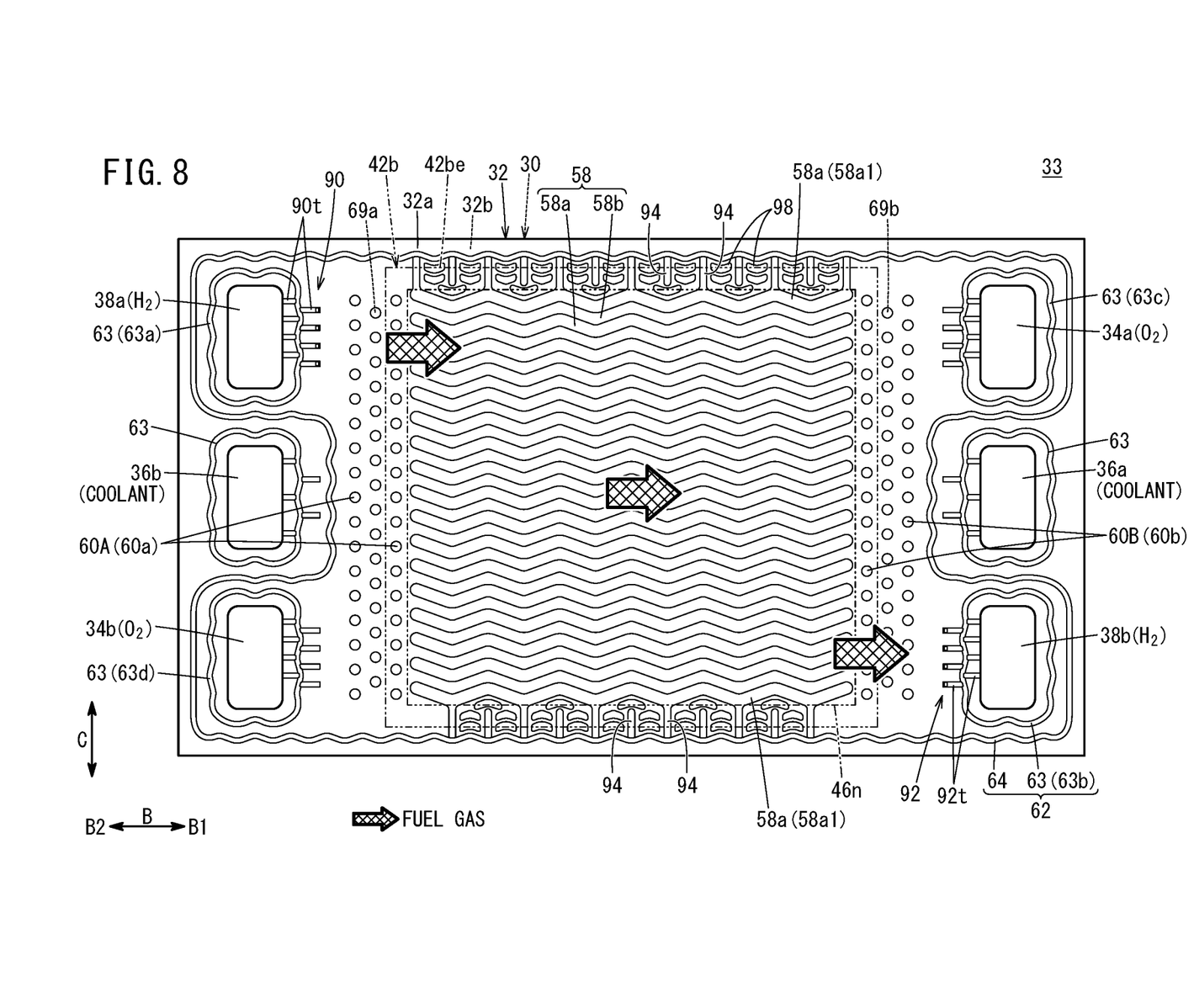
FIG. 8 is a plan view showing the power generation cell as viewed from the second metal separator.

As shown in FIG. 8, the second metal separator 32 has a fuel gas flow field 58 on its surface 32a facing the resin film equipped MEA 28 (see FIG. 1). For example, the fuel gas flow field 58 extends in the direction indicated by the arrow B.

The fuel gas flow field 58 is connected to (in fluid communication with) the fuel gas supply passage 38a and the fuel gas discharge passage 38b. The fuel gas flow field 58 includes a plurality of flow grooves 58b between a plurality of flow field forming ridges 58a extending in the direction indicated by the arrow B. Therefore, in the fuel gas flow field 58, the plurality of flow field forming ridges 58a and the plurality of flow grooves 58b are arranged in the flow field width direction (indicated by the arrow C) alternately. In the embodiment of the present invention, the flow field forming ridges 58a and the flow grooves 58b have a wavy shape in a plan view. However, the present invention is not limited in this respect. The flow field forming ridges 58a and the flow grooves 58b may have a straight shape in a plan view. Hereinafter, among the plurality of flow field forming ridges 58a, the flow field forming ridges positioned at both ends in the flow field width direction will be referred to as an "end flow field forming ridges 58a1". The end flow field forming ridges 58a1 are provided inside an outer end surface 42be of the second gas diffusion layer 42b.

An inlet buffer 60A is provided on the surface 32a of the second metal separator 32, between the fuel gas supply passage 38a and the fuel gas flow field 58. The inlet buffer 60A includes a plurality of boss arrays each including a plurality of bosses 60a extending in the direction indicated by the arrow C. Further, an outlet buffer 60B including a plurality of boss arrays is provided on the surface 32a of the second metal separator 32, between the fuel gas discharge passage 38b and the fuel gas flow field 58. Each of the boss arrays includes a plurality of bosses 60b.

On a surface 32b of the second metal separator 32, opposite to the fuel gas flow field 58, boss arrays each including a plurality of bosses 69a arranged in the direction indicated by the arrow C are provided between boss arrays of the inlet buffer 60A, and boss arrays each including a plurality of bosses 69b arranged in the direction indicated by the arrow C are provided between the boss arrays of the outlet buffer 60B. The bosses 69a and the bosses 69b protrude toward the surface 32b. The bosses 69a, 69b form a buffer on the coolant surface.

A second seal line 62 is formed on the surface 32a of the second metal separator 32. The second seal line 62 is formed by press forming, and expanded toward the resin film equipped MEA 28. Though not shown in detail, resin material is fixed to protruding front surfaces of the second seal line 62 by printing, coating, etc. The resin material is not essential. The resin material may be dispensed with.

As shown in FIG. 8, the second seal line 62 includes a plurality of bead seals 63 (hereinafter referred to as the "passage beads 63") provided around the plurality of fluid passages (fluid passage 38a, etc.), respectively, and a bead seal 64 (hereinafter referred to as the "outer bead 64") provided around the fuel gas flow field 58, the inlet buffer 60A, and the outlet buffer 60B.

The plurality of passage beads 63 protrude from the surface 32a of the second metal separator 32, and are provided around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b, respectively. Hereinafter, among the plurality of passage beads 63, the passage bead formed around the fuel gas supply passage 38a will be referred to as a "passage bead 63a", and the passage bead formed around the fuel gas discharge passage 38b will be referred to as a "passage bead 63b".

The second metal separator 32 has bridge sections 90, 92 connecting the inside of the passage beads 63a, 63b (fluid passages 38a, 38b) around the fuel gas supply passage 38a and the fuel gas discharge passage 38b and the outside (fuel gas flow field 58) of the passage beads 63a, 63b. The bridge section 90 is provided on a side part of the passage bead 63a formed around the fuel gas supply passage 38a, adjacent to the fuel gas flow field 58. The bridge section 92 is provided on a side part of the passage bead 63b formed around the fuel gas discharge passage 38b, adjacent to the fuel gas flow field 58 (including tunnels 92t provided at intervals).

The bridge sections 90, 92 include a plurality of tunnels 90t, 92t inside and outside the passage beads 63a, 63b, respectively. The tunnels 90t, 92t are formed by press forming to protrude from the surface 32a of the second metal separator 32 toward the resin film equipped MEA 28 (see FIG. 2).

Figure 9:
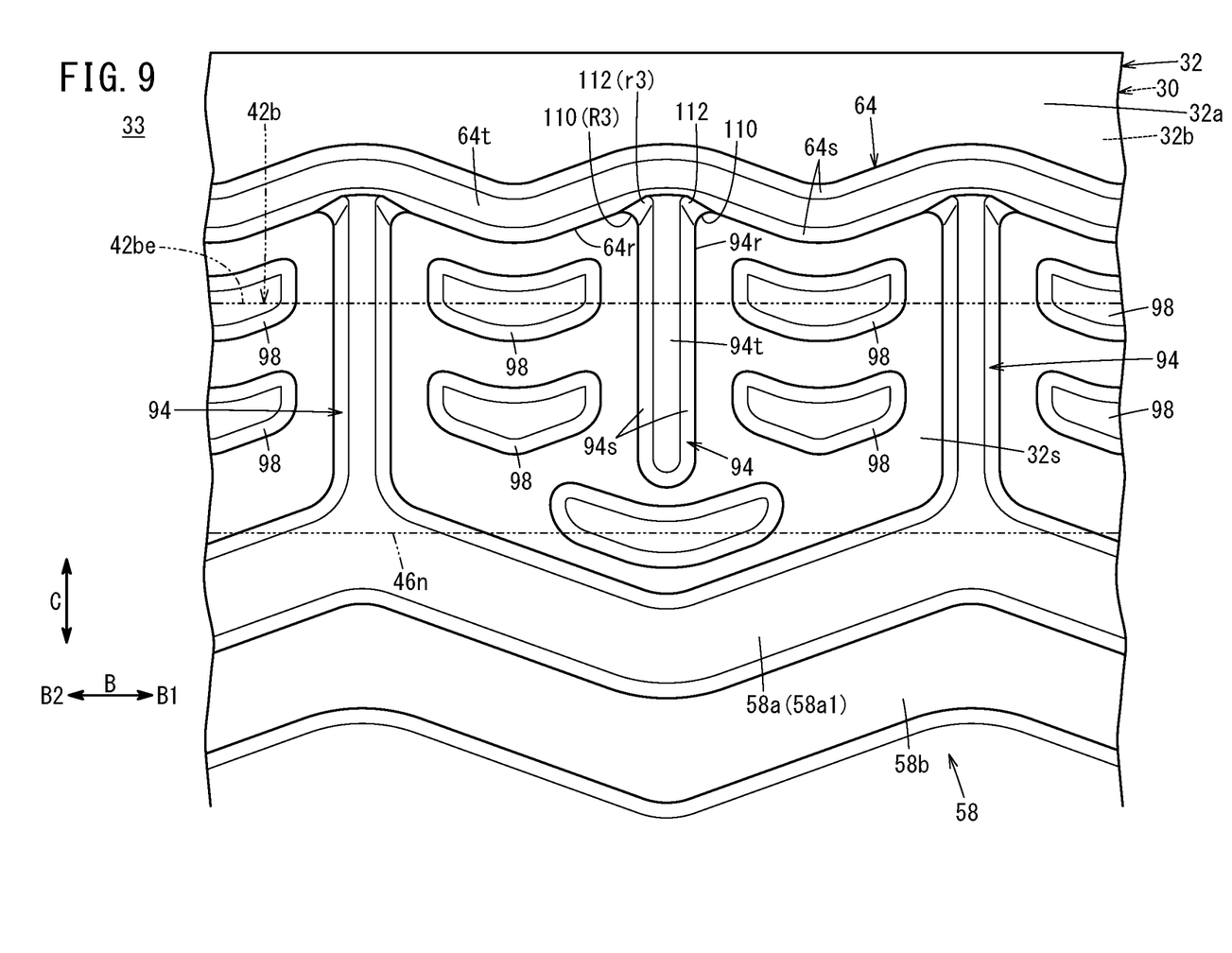
FIG. 9 is an enlarged plan view showing main components of the second metal separator.

Second bypass stop protrusions 94 for preventing bypassing of the fuel gas are provided between both ends of the fuel gas flow field 58 in the flow filed width direction (end flow field forming ridges 58a1) and the outer bead 64. In the embodiment of the present invention, the flow field width direction of the fuel gas flow field 58 is the direction (indicated by the arrow C) along the short sides of the rectangular second metal separator 32. The second bypass stop protrusions 94 are formed to protrude toward the resin film equipped MEA 28 (see FIG. 2).

The second bypass stop protrusions 94 are provided at intervals in the direction in which the flow grooves 58b extend in the direction indicated by the arrow B.

Each of the second bypass stop protrusions 94 protrudes from the outer bead 64, and extends in the flow field width direction of the fuel gas flow field 58. Each of the second bypass stop protrusions 94 has one end connected to the outer bead 64. Some of the second bypass stop protrusions 94 have the other end connected to the end flow field forming ridge 58a1, and the other second bypass stop protrusions 94 have the other end which is not connected to the end flow field forming ridge 58a1 (which is spaced from the end flow field forming ridge 58a1). These two types of the second bypass stop protrusions 94 are arranged alternately.

As in the case first bypass stop protrusions 84 (FIG. 3), all of the second bypass stop protrusions 94 may be connected to the end flow field forming ridge 58a1.

Intermediate protrusions 98 supporting the outer end of the MEA 28a are provided between the second bypass stop protrusions 94 that are adjacent to each other. The intermediate protrusions 98 protrude toward the resin film equipped MEA 28. A plurality of the intermediate protrusions 98 are provided at each position between the second bypass stop protrusions 94 that are adjacent to each other.

As in the case of the outer bead 54 of the first metal separator 30, the outer bead 64 has a substantially trapezoidal shape in cross section which is tapered toward its protruding front end. The outer bead 64 may have a rectangular shape in lateral cross section.

The second bypass stop protrusion 94 includes roots 94r as rising start points from a base plate 32s. Each of the side walls 94s of the second bypass stop protrusion 94 rises from the base plate 32s, and form a portion extending from the root 94r to a top 94t. As in the case of the first bypass stop protrusions 84, the second bypass stop protrusions 94 have a substantially trapezoidal shape. The second bypass stop protrusions 94 may have a rectangular shape in lateral cross section. The protruding height of the second bypass stop protrusions 94 from the base plate 32s of the second metal separator 32 (height of the top 94t) is lower than the protruding height of the outer bead 64 from the base plate 32s (height of a top 64t).

A connection part 110 of the root 94r of the second bypass stop protrusion 94 connected to the outer bead 64 (connection part connected to a root 64r of the outer bead 64) is curved in a circular arc shape. At the connection part 110, the root 64r of the outer bead 64 and the root 94r of the second bypass stop protrusion 94 are connected together. A connection part 112 of the side wall 94s of the second bypass stop protrusion 94 connected to the outer bead 64 (side walls 64s) is curved in a circular arc shape. The connection part 112 is a part between the root 94r and the top 94t where the side wall 94s of the second bypass stop protrusion 94 and the side wall 64s of the outer bead 64 are connected together. In a plan view as viewed in the separator thickness direction, the outer bead 64 has a wavy portion. The second bypass stop protrusions 94 as the intersecting elements are connected to curves of the wavy portion of the outer bead 64. Specifically, the second bypass stop protrusions 94 are connected to curves of the wavy portion of the outer bead 64 protruding toward the outer marginal portion of the second metal separator 32.

The radius of curvature R3 of the connection part 110 between the roots 64r, 94r is larger than the radius of curvature r3 of the connection part 112 between the side walls 64s, 94s (R3>r3). The radius of curvature r3 of the connection part 112 between the side walls 64s, 94s gets larger toward the connection part 110 between the roots 64r, 94r. The connection part 110 between the roots 64r, 94r may not be a curve (circular arc) including a single radius of curvature. The connection part 110 may be a curve having different radii of curvature. The connection part 112 may include a portion where the radius of curvature r3 is substantially zero.

In FIG. 8, the plurality of tunnels 90t of the bridge section 90 (one of the bridge sections) of the second metal separator 32 and the plurality of tunnels 92t of the bridge section 92 (the other of the bridge sections) of the second metal separator 32 have the same structure as the plurality of tunnels 80t of the bridge section 80 of the first metal separator 30. Therefore, the connection parts of the tunnels 90t connected to the passage bead 63a, and the connection parts of the plurality of tunnels 92t connected to the passage bead 63b have the same structure as the connection parts of the tunnels 80t connected to the passage bead 53a in the first metal separator 30.

As shown in FIG. 1, a coolant flow field 66 is formed between the surface 30b of the first metal separator 30 and the surface 32b of the second metal separator 32 that are joined together. The coolant flow field 66 is connected to (in fluid communication with) the coolant supply passage 36a and the coolant discharge passage 36b. The coolant flow field 66 is formed by stacking a back surface of the first metal separator 30 (the back side of the oxygen-containing gas flow field 48) and a back surface of the second metal separator 32 (the back side of the fuel gas flow field 58) together.

Operation of the power generation cell 12 having the above structure will be described below.

First, as shown in FIG. 1, an oxygen-containing gas such as air is supplied to the oxygen-containing gas supply passage 34a. A fuel gas such as a hydrogen-containing gas is supplied to the fuel gas supply passage 38a. Coolant such as pure water, ethylene glycol, oil is supplied to the coolant supply passage 36a.

As shown in FIG. 3, the oxygen-containing gas flows from the oxygen-containing gas supply passage 34a to the oxygen-containing gas flow field 48 of the first metal separator 30. Then, the oxygen-containing gas flows along the oxygen-containing gas flow field 48 in the direction indicated by the arrow B, and the oxygen-containing gas is supplied to the cathode 44 of the MEA 28a (see FIG. 2). In the meanwhile, as shown in FIG. 8, the fuel gas flows from the fuel gas supply passage 38a into the fuel gas flow field 58 of the second metal separator 32. The fuel gas flows along the fuel gas flow field 58 in the direction indicated by the arrow B, and the fuel gas is supplied to the anode 42 of the MEA 28a (see FIG. 2).

Thus, in each of the MEAs 28a, the oxygen-containing gas supplied to the cathode 44 and the fuel gas supplied to the anode 42 are partially consumed in electrochemical reactions in the first electrode catalyst layer 44a and the second electrode catalyst layer 42a to generate electricity.

Then, as shown in FIG. 1, after the oxygen-containing gas supplied to the cathode 44 is partially consumed at the cathode 44, the oxygen-containing gas flows from the oxygen-containing gas flow field 48 to the oxygen-containing gas discharge passage 34b, and the oxygen-containing gas is discharged along the oxygen-containing gas discharge passage 34b in the direction indicated by the arrow A. Likewise, after the fuel gas supplied to the anode 42 is partially consumed at the anode 42, the fuel gas flows from the fuel gas flow field 58 to the fuel gas discharge passage 38b, and the fuel gas is discharged along the fuel gas discharge passage 38b in the direction indicated by the arrow A.

Further, the coolant supplied to the coolant supply passage 36a flows into the coolant flow field 66 between the first metal separator 30 and the second metal separator 32, and then, the coolant flows in the direction indicated by the arrow B. After the coolant cools the MEA 28a, the coolant is discharged from the coolant discharge passage 36b.

The power generation cell 12 having the bead seal structure according to the embodiment of the present invention offers the following advantages.

Hereinafter, the advantages of the embodiment of the present invention will be described in connection with the typical bead seal structure made up of the outer bead 54 and the first bypass stop protrusions 84 provided in the first metal separator 30. However, also in the bead structure made up of the passage bead 53 and the tunnels 80*t* (or the tunnels 82*t*), and the similar bead structure provided in the second metal separator 32, the same advantages are obtained.

In the bead seal structure provided in the first metal separator 30, the radius of curvature R1 of the connection part 102 of the root 84*r* of the first bypass stop protrusion 84 as the intersecting element connected to the outer bead 54 is larger than the radius of curvature r1 of the connection part 104 of the side wall 84*s* of the first bypass stop protrusion 84 connected to the outer bead 54. In the structure, it is possible to reduce the sensitivity of the surface pressure (seal surface pressure) of the top 54*t* of the outer bead 54 to the dimensional variation such as tolerance. Accordingly, it is possible to achieve uniform surface pressure distribution (suppression of surface pressure variation) at the top 54*t* of the outer bead 54.

Figure 10:
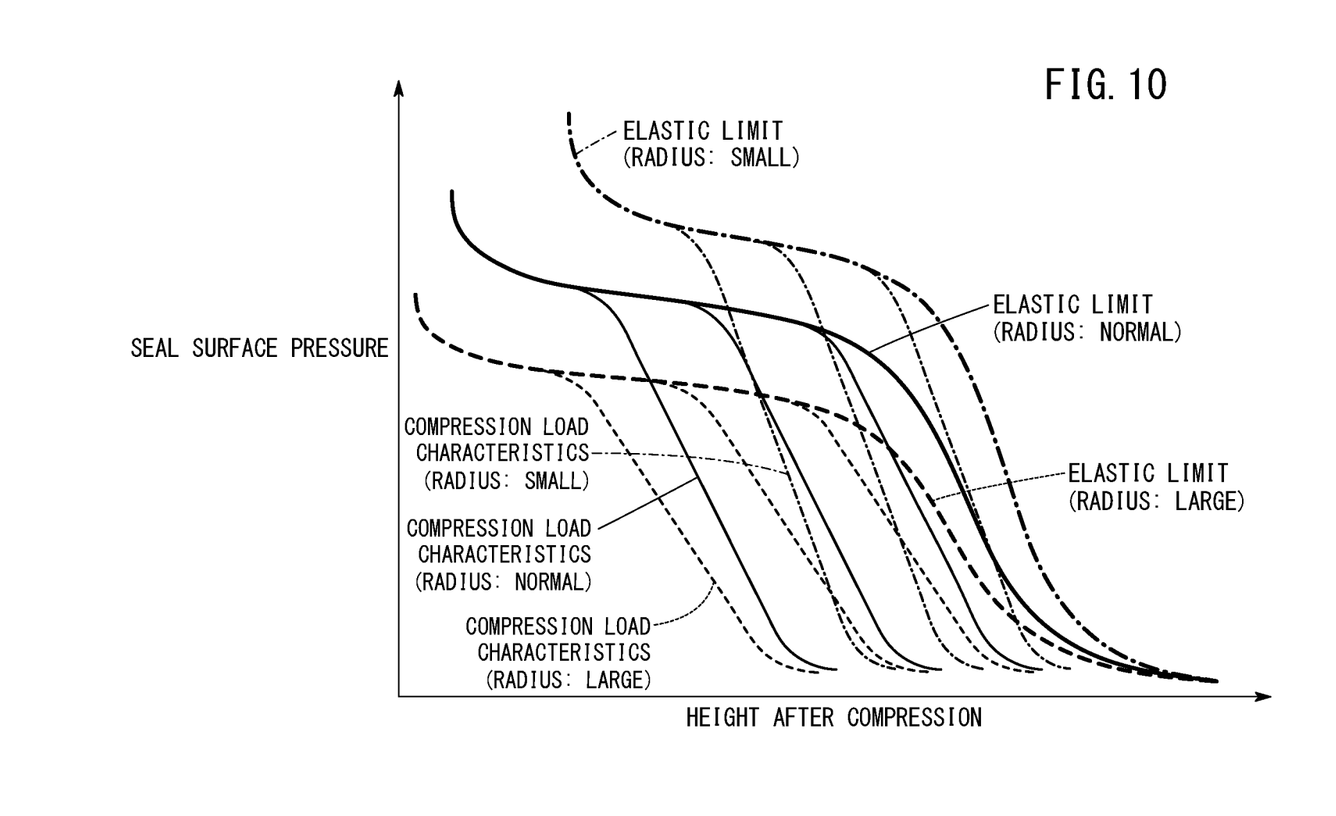
FIG. 10 is a graph showing compression load characteristics of a bead seal in the case where the radius of curvature at the root of the connection part in an intersecting element is changed.

In the case where the radius of curvature of the connection part between the roots of the bead seal and the intersecting element is large, as shown in FIG. 10, it is possible to smooth the compression load characteristics. Therefore, it becomes possible to reduce the sensitivity of the seal surface pressure (line pressure) to the dimensional variation such as tolerance. By smoothing the compression load characteristics, it is possible to reduce variation of the seal surface pressure due to the dimensional changes, and expand the area where sealing is provided.

In contrast, if the radius of curvature between the root of the bead seal and the root of the intersecting element is small, it is possible to raise the upper limit of the elastic range (elastic limit) of the bead seal. Therefore, it becomes easier to withstand the load, e.g., when a large impact is applied in the absence of dimensional changes.

The present invention is not limited to the above described embodiments. Various modifications may be made without departing from the gist of the present invention.

What is claimed is:

1. A bead seal structure comprising:
 a bead seal formed in a fuel cell metal separator to protrude in a separator thickness direction, the bead seal being configured to prevent leakage of fluid; and
 an intersecting element intersecting with the bead seal,
 wherein the intersecting element includes a root as a rising start point from a base plate of the fuel cell metal separator, and a side wall rising from the base plate; and
 a radius of curvature of a connection part of the root of the intersecting element connected to a root of the bead seal is larger than a radius of curvature of a connection part of the side wall of the intersecting element connected to a side wall of the bead seal.

2. The bead seal structure according to claim 1, wherein the intersecting element is a bypass stop protrusion configured to prevent bypassing of the fluid, or a tunnel including an internal space connected to the bead seal.

3. The bead structure according to claim 1, wherein the intersecting element is configured to intersect with the bead seal at an angle of 90° in a plan view as viewed in the separator thickness direction.

4. The bead seal structure according to claim 1, wherein a top height of the intersecting element is lower than a top height of the bead seal.

5. The bead seal structure according to claim 1, wherein the bead seal has a trapezoidal shape in cross section.

6. The bead seal structure according to claim 1, wherein the intersecting element has a trapezoidal shape in cross section.

7. The bead seal structure according to claim 1, wherein the bead seal includes a wavy portion in a plan view as viewed in the separator thickness direction; and
 the intersecting element is connected to a curve of the wavy portion.

8. The bead seal structure according to claim 7, wherein the intersecting element is connected to the curve of the wavy portion protruding toward an outer marginal portion of the fuel cell metal separator.

9. The bead seal structure according to claim 1, wherein the radius of curvature of the connection part of the side wall connected to the bead seal gets larger toward the connection part of the root connected to the bead seal.

* * * * *